US010353571B2

(12) United States Patent
Gan et al.

(10) Patent No.: US 10,353,571 B2
(45) Date of Patent: Jul. 16, 2019

(54) METHOD AND APPARATUS FOR PREVENTING TOUCHSCREEN MISOPERATION

(71) Applicant: Huawei Technologies Co., Ltd., Shenzhen (CN)

(72) Inventors: Yuanli Gan, Shenzhen (CN); Gang Li, Panama (PA); Mahong Fu, Lima (PE); Huaqi Hao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 160 days.

(21) Appl. No.: 15/507,154

(22) PCT Filed: Aug. 29, 2014

(86) PCT No.: PCT/CN2014/085573
§ 371 (c)(1),
(2) Date: Feb. 27, 2017

(87) PCT Pub. No.: WO2016/029449
PCT Pub. Date: Mar. 3, 2016

(65) Prior Publication Data
US 2017/0285868 A1 Oct. 5, 2017

(51) Int. Cl.
*G06F 3/041* (2006.01)
*G06F 3/0488* (2013.01)
(Continued)

(52) U.S. Cl.
CPC .......... *G06F 3/0488* (2013.01); *G06F 1/1626* (2013.01); *G06F 1/1643* (2013.01);
(Continued)

(58) Field of Classification Search
None
See application file for complete search history.

(56) References Cited

U.S. PATENT DOCUMENTS 7,728,316 B2 * 6/2010 Fadell .................. G06F 3/0304
250/559.38
9,395,793 B2 * 7/2016 Wang .................... G06F 1/1694
(Continued)

FOREIGN PATENT DOCUMENTS

CN 101414843 A 4/2009
CN 102866849 A 1/2013
(Continued)

*Primary Examiner* — Kent W Chang
*Assistant Examiner* — Benjamin Morales
(74) *Attorney, Agent, or Firm* — Slater Matsil, LLP

(57) ABSTRACT

The present invention belongs to the field of communications technologies, and discloses a method and an apparatus for preventing a touchscreen misoperation. The method includes detecting whether an object exists within a preset distance facing a touchscreen of a mobile terminal and detecting light intensity of an environment in which the touchscreen is located. The method also includes detecting whether an angle between a plane on which the touchscreen is located and a horizontal plane falls within a preset angle range. Additionally, the method includes setting the touchscreen of the mobile terminal to a touch-disable mode if an object exists within the preset distance facing the touchscreen of the mobile terminal, the detected light intensity is less than preset intensity, and it is detected that the angle between the plane on which the touchscreen is located and the horizontal plane does not fall within the preset angle range.

16 Claims, 7 Drawing Sheets

(51) Int. Cl.
*G09G 3/34* (2006.01)
*G09G 5/00* (2006.01)
*G06F 21/83* (2013.01)
*G06F 1/16* (2006.01)

(52) U.S. Cl.
CPC ........... *G06F 21/83* (2013.01); *G09G 3/3406* (2013.01); *G09G 5/003* (2013.01)

(56) References Cited

U.S. PATENT DOCUMENTS

| | | | | |
|---|---|---|---|---|
| 2003/0197597 | A1* | 10/2003 | Bahl | G06F 1/3203 340/7.58 |
| 2007/0075965 | A1* | 4/2007 | Huppi | H04M 1/72563 345/156 |
| 2009/0153490 | A1* | 6/2009 | Nymark | H04M 1/72519 345/169 |
| 2012/0154294 | A1 | 6/2012 | Hinckley et al. | |
| 2013/0157726 | A1 | 6/2013 | Miyazaki et al. | |
| 2013/0212416 | A1* | 8/2013 | Crisan | G06F 1/1694 713/323 |

FOREIGN PATENT DOCUMENTS

| | | |
|---|---|---|
| CN | 102902478 A | 1/2013 |
| CN | 102917130 A | 2/2013 |
| CN | 102946472 A | 2/2013 |
| CN | 102984372 A | 3/2013 |
| CN | 103024197 A | 4/2013 |
| CN | 103095915 A | 5/2013 |
| CN | 103369144 A | 10/2013 |
| CN | 103412719 A | 11/2013 |
| CN | 103516901 A | 1/2014 |
| CN | 103677599 A | 3/2014 |
| CN | 103853309 A | 6/2014 |
| CN | 103902854 A | 7/2014 |

* cited by examiner

METHOD AND APPARATUS FOR PREVENTING TOUCHSCREEN MISOPERATION

CROSS-REFERENCE TO RELATED APPLICATIONS

This application is a national stage of International Application No. PCT/CN2014/085573, filed on Aug. 29, 2014, which is hereby incorporated by reference in its entirety.

TECHNICAL FIELD

The present invention relates to the field of communications technologies, and in particular, to a method and an apparatus for preventing a touchscreen misoperation.

BACKGROUND

With continuous development of mobile terminals, the mobile terminals such as a mobile phone, a notebook computer, and a tablet computer have appeared on the market. The mobile terminal can be used basically at any time and any place, and therefore becomes a tool on which people rely for communication. An application of a high and new technology to the mobile terminal greatly enriches application functions and operation manners of the mobile terminal, which makes the mobile terminal become an indispensable tool in daily life and work. Particularly, after a touchscreen technology is applied to the mobile terminal, a user can more conveniently operate the mobile terminal, and the mobile terminal is more user-friendly. For example, the user can answer or reject an incoming call by gently sliding on a touchscreen.

The touchscreen technology brings great convenience to the user, but meanwhile sensitive perception of the touchscreen also easily causes a misoperation. Generally, the mobile terminal is placed at a position within easy reach of the user, for example, inside a bag or a trouser pocket. However, the user is in a motion state for most time, and if a touchscreen of the mobile terminal continuously keeps in an unlocked state, an incorrect touch easily occurs on the touchscreen and triggers a misoperation, for example, incorrectly dialing, incorrectly deleting an SMS message, or incorrectly accessing a network and using traffic. In a severe case, a loss of important information may be caused.

SUMMARY

The present invention provides a method and an apparatus for preventing a touchscreen misoperation, which can reduce a possibility that a misoperation is triggered because a touchscreen of a mobile terminal is in an unlocked state.

According to a first aspect, a method for preventing a touchscreen misoperation is provided, and the method includes detecting whether an object exists within a preset distance facing a touchscreen of a mobile terminal, detecting light intensity of an environment in which the touchscreen is located, and detecting whether an angle between a plane on which the touchscreen is located and a horizontal plane falls within a preset angle range. The method also includes setting the touchscreen of the mobile terminal to a touch-disable mode if an object exists within the preset distance facing the touchscreen of the mobile terminal, the detected light intensity is less than preset intensity, and it is detected that the angle between the plane on which the touchscreen is located and the horizontal plane does not fall within the preset angle range.

With reference to the first aspect, in a first possible implementation manner of the first aspect, after the step of setting the touchscreen of the mobile terminal to a touch-disable mode, the method further includes: when the mobile terminal detects a touchscreen enable event, detecting whether an object exists within the preset distance facing the touchscreen of the mobile terminal; and if no object exists within the preset distance facing the touchscreen of the mobile terminal, making the touchscreen of the mobile terminal exit the touch-disable mode.

With reference to the first aspect, in a second possible implementation manner of the first aspect, after the step of setting the touchscreen of the mobile terminal to a touch-disable mode, the method further includes: when the mobile terminal detects a touchscreen enable event, detecting whether an object exists within the preset distance facing the touchscreen of the mobile terminal, and detecting whether an angle between a plane on which the touchscreen is located and the horizontal plane falls within the preset angle range; and if no object exists within the preset distance facing the touchscreen of the mobile terminal, and it is detected that the angle between the plane on which the touchscreen is located and the horizontal plane falls within the preset angle range, making the touchscreen of the mobile terminal exit the touch-disable mode.

With reference to the first aspect, in a third possible implementation manner of the first aspect, after the step of setting the touchscreen of the mobile terminal to a touch-disable mode, the method further includes: when the mobile terminal detects a touchscreen enable event, detecting whether an object exists within the preset distance facing the touchscreen of the mobile terminal, detecting light intensity of an environment in which the touchscreen is located, and detecting whether an angle between a plane on which the touchscreen is located and the horizontal plane falls within the preset angle range; and if no object exists within the preset distance facing the touchscreen of the mobile terminal, the detected light intensity is greater than or equal to the preset intensity, and it is detected that the angle between the plane on which the touchscreen is located and the horizontal plane falls within the preset angle range, making the touchscreen of the mobile terminal exit the touch-disable mode.

With reference to the first aspect, the first possible implementation manner of the first aspect, the second possible implementation manner of the first aspect, or the third possible implementation manner of the first aspect, in a fourth possible implementation manner of the first aspect, the detecting whether an object exists within a preset distance facing a touchscreen of a mobile terminal includes: detecting, by using a proximity sensor, whether an object exists within the preset distance facing the touchscreen of the mobile terminal.

With reference to the first aspect, or the first possible implementation manner of the first aspect, or the second possible implementation manner of the first aspect, or the third possible implementation manner of the first aspect, or the fourth possible implementation manner of the first aspect, in a fifth possible implementation manner of the first aspect, the step of setting the touchscreen of the mobile terminal to a touch-disable mode if an object exists within the preset distance facing the touchscreen of the mobile terminal, the detected light intensity is less than preset intensity, and it is detected that the angle between the plane on which the touchscreen is located and the horizontal plane does not fall within the preset angle range specifically includes: when preset conditions are continuously met for specified duration, setting the touchscreen of the mobile terminal to the touch-disable mode, where the preset conditions are as follows: an object exists within the preset distance facing the touchscreen of the mobile terminal, the detected light intensity is less than the preset intensity, and it is detected that the angle between the plane on which the touchscreen is located and the horizontal plane does not fall within the preset angle range.

According to a second aspect, an apparatus for preventing a touchscreen misoperation is provided, where the apparatus includes a detection unit and a touch-disable mode unit, where the detection unit is configured to detect whether an object exists within a preset distance facing a touchscreen of a mobile terminal, detect light intensity of an environment in which the touchscreen is located, and detect whether an angle between a plane on which the touchscreen is located and a horizontal plane falls within a preset angle range. Also, the touch-disable mode unit is configured to set the touchscreen of the mobile terminal to a touch-disable mode if the detection unit detects that an object exists within the preset distance facing the touchscreen of the mobile terminal, the light intensity detected by the detection unit is less than preset intensity, and the detection unit detects that the angle between the plane on which the touchscreen is located and the horizontal plane does not fall within the preset angle range.

With reference to the second aspect, in a first possible implementation manner of the second aspect, the detection unit is further configured to: when the mobile terminal detects a touchscreen enable event, detect whether an object exists within the preset distance facing the touchscreen of the mobile terminal; and the apparatus further includes an exit unit, where the exit unit is configured to: when the detection unit detects that no object exists within the preset distance facing the touchscreen of the mobile terminal, make the touchscreen of the mobile terminal exit the touch-disable mode.

With reference to the second aspect, in a second possible implementation manner of the second aspect, the detection unit is further configured to: when the mobile terminal detects a touchscreen enable event, detect whether an object exists within the preset distance facing the touchscreen of the mobile terminal, and detect whether an angle between a plane on which the touchscreen is located and the horizontal plane falls within the preset angle range; and the apparatus further includes an exit unit, where the exit unit is configured to: when the detection unit detects that no object exists within the preset distance facing the touchscreen of the mobile terminal, and detects that the angle between the plane on which the touchscreen is located and the horizontal plane falls within the preset angle range, make the touchscreen of the mobile terminal exit the touch-disable mode.

With reference to the second aspect, in a third possible implementation manner of the second aspect, the detection unit is further configured to: when the mobile terminal detects a touchscreen enable event, detect whether an object exists within the preset distance facing the touchscreen of the mobile terminal, detect light intensity of an environment in which the touchscreen is located, and detect whether an angle between a plane on which the touchscreen is located and the horizontal plane falls within the preset angle range; and the apparatus further includes an exit unit, where the exit unit is configured to: when the detection unit detects that no object exists within the preset distance facing the touchscreen of the mobile terminal, the light intensity detected by the detection unit is greater than or equal to the preset intensity, and the detection unit detects that the angle between the plane on which the touchscreen is located and the horizontal plane falls within the preset angle range, make the touchscreen of the mobile terminal exit the touch-disable mode.

With reference to the second aspect, or the first possible implementation manner of the second aspect, or the second possible implementation manner of the second aspect, or the third possible implementation manner of the second aspect, in a fourth possible implementation manner of the second aspect, the detection unit includes an object detection unit, an ambient light detection unit, and an angle detection unit, where the object detection unit is configured to detect, by using a proximity sensor, whether an object exists within the preset distance facing the touchscreen of the mobile terminal; the ambient light detection unit is configured to detect the light intensity of the environment in which the touchscreen is located; and the angle detection unit is configured to detect whether the angle between the plane on which the touchscreen is located and the horizontal plane falls within the preset angle range.

With reference to the second aspect, or the first possible implementation manner of the second aspect, or the second possible implementation manner of the second aspect, or the third possible implementation manner of the second aspect, or the fourth possible implementation manner of the second aspect, in a fifth possible implementation manner of the second aspect, the touch-disable mode unit is specifically configured to: when preset conditions are continuously met for specified duration, set the touchscreen of the mobile terminal to the touch-disable mode, where the preset conditions are as follows: an object exists within the preset distance facing the touchscreen of the mobile terminal, the detected light intensity is less than the preset intensity, and it is detected that the angle between the plane on which the touchscreen is located and the horizontal plane does not fall within the preset angle range.

According to a third aspect, a mobile terminal having a touchscreen is provided, including: a proximity sensor, configured to detect whether an object exists within a preset distance facing the touchscreen; an ambient light sensor, configured to detect light intensity of an environment in which the mobile terminal is located; an angle sensor, configured to detect whether an angle between a plane on which the touchscreen is located and a horizontal plane falls within a preset angle range; and a processor, configured to set the touchscreen of the mobile terminal to a touch-disable mode when the proximity sensor detects that an object exists within the preset distance facing the touchscreen, the light intensity detected by the ambient light sensor is less than preset intensity, and the angle sensor detects that the angle between the plane on which the touchscreen is located and the horizontal plane does not fall within the preset angle range.

With reference to the third aspect, in a first possible implementation manner of the third aspect, the processor is further configured to: detect a touchscreen enable event of the mobile terminal, and when detecting the touchscreen enable event, instruct the proximity sensor to detect whether an object exists within the preset distance facing the touchscreen; and when the proximity sensor detects that no object exists within the preset distance facing the touchscreen, make the mobile terminal exit the touch-disable mode.

With reference to the third aspect, in a second possible implementation manner of the third aspect, the processor is further configured to: detect a touchscreen enable event of the mobile terminal, and when detecting the touchscreen enable event, instruct the proximity sensor to detect whether an object exists within the preset distance facing the touchscreen, and instruct the angle sensor to detect whether an angle between a plane on which the touchscreen is located and the horizontal plane falls within the preset angle range; and when the proximity sensor detects that no object exists within the preset distance facing the touchscreen, and the angle sensor detects that the angle between the plane on which the touchscreen is located and the horizontal plane falls within the preset angle range, make the mobile terminal exit the touch-disable mode.

With reference to the third aspect, in a third possible implementation manner of the third aspect, the processor is further configured to: detect a touchscreen enable event of the mobile terminal, and when detecting the touchscreen enable event, instruct the proximity sensor to detect whether an object exists within the preset distance facing the touchscreen, instruct the ambient light sensor to detect light intensity of an environment in which the mobile terminal is located, and instruct the angle sensor to detect whether an angle between a plane on which the touchscreen is located and the horizontal plane falls within the preset angle range; and when the proximity sensor detects that no object exists within the preset distance facing the touchscreen, the light intensity detected by the ambient light sensor is greater than or equal to the preset intensity, and the angle sensor detects that the angle between the plane on which the touchscreen is located and the horizontal plane falls within the preset angle range, make the mobile terminal exit the touch-disable mode.

With reference to the third aspect, or the first possible implementation manner of the third aspect, or the second possible implementation manner of the third aspect, or the third possible implementation manner of the third aspect, in a fourth possible implementation manner of the third aspect, the processor is further configured to: when preset conditions are continuously met for specified duration, set the touchscreen of the mobile terminal to the touch-disable mode, where the preset conditions are as follows: the proximity sensor detects that an object exists within the preset distance facing the touchscreen of the mobile terminal, the light intensity detected by the ambient light sensor is less than the preset intensity, and the angle sensor detects that the angle between the plane on which the touchscreen is located and the horizontal plane does not fall within the preset angle range.

Beneficial effects of the present invention are as follows: A touchscreen of a mobile terminal is set to a touch-disable mode when the following conditions are met: an object exists within a preset distance facing the touchscreen of the mobile terminal, detected light intensity is less than preset intensity, and it is detected that an angle between a plane on which the touchscreen is located and a horizontal plane does not fall within a preset angle range. When the user is in motion, a misoperation performed by the mobile terminal carried by a user is prevented from being triggered by an incorrect touch on the touchscreen of the mobile terminal.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following further describes the embodiments of the present invention in detail with reference to the accompanying drawings.

It should be noted that in the embodiments of the present invention, when the following conditions are met, a touchscreen enters a touch-disable mode, where the met conditions include: an object exists in a direction facing a touchscreen of a mobile terminal and a distance between the object and the mobile terminal is less than or equal to a preset distance; detected light intensity is less than preset intensity; and it is detected that an angle between a plane on which the touchscreen is located and a horizontal plane does not fall within a preset angle range.

Certainly, a user may make the touchscreen of the mobile terminal exit or switch to the touch-disable mode at any time according to a need of using the mobile terminal. For example, when the user expects to use an application on the mobile terminal, the user may manually make the touchscreen exit the touch-disable mode.

It should be noted that the following modes are provided in the embodiments of the present invention, including modes, such as a touchscreen locked mode and a touchscreen turned-off mode, in which the touchscreen cannot receive a user operation. The user may select one mode from the foregoing modes as the touch-disable mode in advance.

When the touchscreen of the mobile terminal is in the touchscreen locked mode, the touchscreen of the mobile terminal is in a locked state, and the mobile terminal unlocks the touchscreen only in a received preset touch manner. Except for unlocking the touchscreen in the preset touch manner, the mobile terminal does not respond to any other touches received by using the touchscreen.

When the touchscreen of the mobile terminal is in the touchscreen turned-off mode, the touchscreen of the mobile terminal is in a sleep state (in the sleep state, the touchscreen is locked and does not receive any touch operation except an operation of unlocking the touchscreen), and the touchscreen is in a turned-off state. However, during the touchscreen is turned off, the mobile terminal still continues executing a corresponding application program, for example, detecting, by using a proximity sensor, whether an object exists within a preset distance facing the touchscreen of the mobile terminal.

Figure 1:
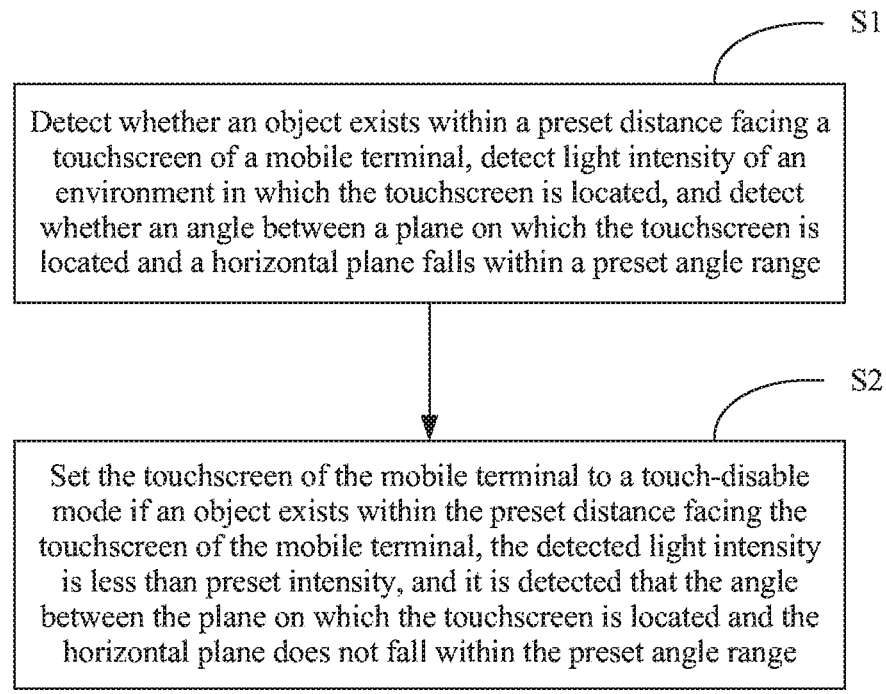
FIG. 1 is a flowchart of a method for preventing a touchscreen misoperation according to an embodiment of the present invention.

Referring to FIG. 1, FIG. 1 is a flowchart of a method for preventing a touchscreen misoperation according to an embodiment of the present invention. The method for preventing a touchscreen misoperation is executed by a mobile terminal, and the method includes the following steps.

Step S1: Detect whether an object exists within a preset distance facing a touchscreen of the mobile terminal, detect light intensity of an environment in which the touchscreen is located, and detect whether an angle between a plane on which the touchscreen is located and a horizontal plane falls within a preset angle range.

In this embodiment of the present invention, an incorrect touch may occur on the touchscreen only in a direction facing the touchscreen of the mobile terminal. Therefore, in this embodiment of the present invention, whether an object exists is detected in the direction facing the touchscreen of the mobile terminal, and if it is detected that an object exists, a distance between the object and the touchscreen of the mobile terminal is further detected, so as to determine whether the distance is less than the preset distance. Generally, during a user moves carrying the mobile terminal, an object within the preset distance from the mobile terminal is prone to cause an incorrect touch on the touchscreen. In this embodiment of the present invention, to reduce or avoid incorrect touches on the touchscreen, the preset distance is predetermined according to experimental data.

In this embodiment of the present invention, an implementation manner of detecting whether an object exists within the preset distance facing the touchscreen of the mobile terminal is: transmitting a high frequency signal (the high frequency signal includes but is not limited to an X-ray, a gamma ray, a laser beam, infrared light, an ultrasonic wave, or the like) towards an object in the direction facing the touchscreen of the mobile terminal; receiving the high frequency signal reflected by the object; obtaining an energy difference (an energy difference between energy used for transmitting the high frequency signal and energy of the reflected high frequency signal) and/or duration (a time interval between a moment of transmitting the high frequency signal and a moment of receiving the reflected high frequency signal) by means of calculation; and determining a distance between the object and the touchscreen of the mobile terminal according to the energy difference and/or the duration obtained by means of calculation.

In an implementation manner of this embodiment of the present invention, the step of detecting whether an object exists within a preset distance facing a touchscreen of the mobile terminal includes: detecting, by using a proximity sensor, whether an object exists within the preset distance facing the touchscreen of the mobile terminal.

In this specific implementation manner, a type of the used proximity sensor is not limited to, for example, an inductive proximity sensor, an electrostatic capacity proximity sensor, an ultrasonic wave proximity sensor, an optoelectronic proximity sensor, or a magnetic proximity sensor.

A manner of detecting, by using an ultrasonic wave proximity sensor, whether an object exists within the preset distance facing the touchscreen of the mobile terminal is specifically: transmitting, by the proximity sensor, an ultrasonic wave signal towards an object in the direction facing the touchscreen of the mobile terminal; receiving the ultrasonic wave signal reflected by the object; obtaining an energy difference (an energy difference between energy of the ultrasonic wave signal during transmission and energy of the reflected ultrasonic wave signal) and/or duration (a time interval between a moment of transmitting the ultrasonic wave signal and a moment of receiving the reflected high frequency signal) by means of calculation; and determining a distance between the object and the touchscreen of the mobile terminal according to the energy difference and/or the duration obtained by means of calculation.

A manner of detecting, by using an optoelectronic proximity sensor, whether an object exists within the preset distance facing the touchscreen of the mobile terminal is specifically: transmitting, by the proximity sensor, infrared light towards an object in the direction facing the touchscreen of the mobile terminal, where the infrared light is reflected when meeting an obstruction; receiving, by the proximity sensor, the reflected infrared light; and calculating a time interval (that is, duration) between a transmit moment of transmitting the infrared light and a receive moment of receiving the reflected light. Because a distance between the touchscreen of the mobile terminal and an object and the time interval have a one-to-one mapping relationship (for example, a linear relationship), a larger time interval obtained by means of calculation represents a longer distance between the touchscreen of the mobile terminal and the object; on the contrary, a smaller time interval obtained by means of calculation represents a shorter distance between the touchscreen of the mobile terminal and the object.

In step S1, the light intensity of the environment in which the touchscreen is located can be detected by using a light sensor. Specifically, the light sensor is disposed on the mobile terminal. Preferably, the light sensor may be additionally disposed in the proximity sensor. The light intensity of the surrounding environment in which the touchscreen is located can be detected by using the light sensor. In the daytime, whether an object exists in the environment in which the touchscreen is located can be further determined by using the detected light intensity. When an object exists in the surrounding environment in which the touchscreen is located, the detected light intensity is relatively low; when no object exists in the surrounding environment in which the touchscreen is located, the detected light intensity is relatively high.

In step S1, the angle between the plane on which the touchscreen of the mobile terminal is located and the horizontal plane can be detected by using an acceleration sensor. To determine the angle between the plane on which the touchscreen of the mobile terminal is located and the horizontal plane, a three-dimensional rectangular Cartesian coordinate is established for the touchscreen of the mobile terminal in this embodiment and is represented by x, y, and z. A horizontal axis and a vertical axis on a horizontal plane of the touchscreen are respectively represented by x and y, and a direction perpendicular to the horizontal plane is represented by z. In the Cartesian coordinate, when the touchscreen is horizontally placed, a length side of the touchscreen is determined as a y-direction, a width side of the touchscreen is determined as an x-direction, and a direction (a direction that is perpendicular to the horizontal plane of the touchscreen and is away from the touchscreen of the mobile terminal) perpendicular to the touchscreen is set as a z-direction. The acceleration sensor can obtain, by means of calculation, the angle between the plane on which the touchscreen is located and the horizontal plane by measuring accelerations in the three directions (x, y, z).

For example, when detecting that the accelerations of the touchscreen in the three directions (x, y, z) are (0, 0, g), the acceleration sensor can determine that the angle between the plane on which the touchscreen of the mobile terminal is located and the horizontal plane is 0 degree, so as to determine that the mobile terminal is horizontally placed.

For example, when detecting that the accelerations of the touchscreen in the three directions (x, y, z) are (0, 0.707 g, 0.707 g), the acceleration sensor can determine that the angle between the plane on which the touchscreen of the mobile terminal is located and the horizontal plane is 45 degrees, that is, it is determined that the mobile terminal is placed at an angle of 45 degrees to the horizontal plane.

For another example, when detecting that the accelerations of the touchscreen in the three directions (x, y, z) are (0, 0, −g), the acceleration sensor can determine that the angle between the plane on which the touchscreen of the mobile terminal is located and the horizontal plane is 180 degrees, so as to determine that the mobile terminal is placed face-down.

However, in this embodiment of the present invention, a preset offset is allowed and a general horizontal placement mode is determined. For this general horizontal placement mode, a determined angle between the plane on which the touchscreen of the mobile terminal is located and the horizontal plane is within (0 degree−the preset offset, 0 degree+the preset offset). Specifically, if a detection result obtained by the acceleration sensor by means of detection is not (0, 0, g), but when it is determined, according to the detection result obtained by means of detection, that the angle between the plane on which the touchscreen of the mobile terminal is located and the horizontal plane is within the interval (0 degree−the preset offset, 0 degree+the preset offset), it is still considered that the touchscreen of the mobile terminal is horizontally placed. Therefore, a range that belongs to the interval (0 degree−the preset offset, 0 degree+the preset offset) belongs to the preset angle range. For example, when the preset offset is 5 degrees, the angle that is between the plane on which the touchscreen of the mobile terminal is located and the horizontal plane and that is corresponding to the general horizontal placement mode is within (−5 degrees, 5 degrees). For another example, when the preset offset is to degrees, the angle that is between the plane on which the touchscreen of the mobile terminal is located and the horizontal plane and that is corresponding to the general horizontal placement mode is within (−10 degrees, 10 degrees). For another example, when the preset offset is 15 degrees, the angle that is between the plane on which the touchscreen of the mobile terminal is located and the horizontal plane and that is corresponding to the general horizontal placement mode is within (−15 degrees, 15 degrees). It should be noted that the preset offset is determined according to a need of exiting the touch-disable mode, but the preset offset is preferably set to 15 degrees or less. If the angle that is between the plane on which the touchscreen of the mobile terminal is located and the horizontal plane and that is obtained according to the detection result obtained by the acceleration sensor by means of detection does not belong to the interval (0 degree−the preset offset, 0 degree+the preset offset), it represents that the touchscreen of the mobile terminal is not horizontally placed. In an extreme situation in which the angle that is between the plane on which the touchscreen of the mobile terminal is located and the horizontal plane and that is obtained according to the detection result obtained by the acceleration sensor by means of detection is 180 degrees, it represents that the touchscreen of the mobile terminal is placed face-down. In addition, generally, when the mobile terminal is placed at another position within easy reach, for example, inside a pocket or a bag, the touchscreen of the mobile terminal is not horizontally placed, that is, the angle that is between the plane on which the touchscreen of the mobile terminal is located and the horizontal plane and that is obtained according to the detection result obtained by the acceleration sensor by means of detection does not belong to the interval (0 degree−the preset offset, 0 degree+the preset offset). Therefore, a range that does not belong to the interval (0 degree−the preset offset, 0 degree+the preset offset) does not belong to the preset angle range.

In a specific implementation manner of this embodiment of the present invention, each time when detecting the accelerations of the touchscreen in the three directions (x, y, z), the acceleration sensor obtains the angle by means of calculation according to the detected accelerations in the three directions (x, y, z), and determines, according to the angle obtained by means of calculation, whether the angle between the plane on which the touchscreen of the mobile terminal is located and the horizontal plane falls within the preset angle range (that is, (0 degree−the preset offset, 0 degree+the preset offset)).

In another specific implementation manner of this embodiment of the present invention, corresponding acceleration threshold ranges in the three directions (x, y, z) can be determined according to the predetermined preset angle range (that is, (0 degree−the preset offset, 0 degree+the preset offset)). In this way, each time when detecting the accelerations of the touchscreen in the three directions (x, y, z), the acceleration sensor directly determines whether the detected accelerations in the three directions (x, y, z) correspondingly belong to the acceleration threshold ranges, corresponding to the preset angle range, in the three directions (x, y, z). If the detected accelerations in the three directions (x, y, z) correspondingly belong to the acceleration threshold ranges, corresponding to the preset angle range, in the three directions (x, y, z), it is determined that the angle between the plane on which the touchscreen of the mobile terminal is located and the horizontal plane falls within the preset angle range; if the detected accelerations in the three directions (x, y, z) do not belong to the acceleration threshold ranges, corresponding to the preset angle range, in the three directions (x, y, z), it is determined that the angle between the plane on which the touchscreen of the mobile terminal is located and the horizontal plane does not fall within the preset angle range.

In this way, these steps of calculating the angle according to the detected accelerations in the three directions (x, y, z) and determining, according to the angle obtained by means of calculation, "whether the angle between the plane on which the touchscreen of the mobile terminal is located and the horizontal plane falls within the preset angle range" are omitted, which leads to quicker and more practical operations.

In an implementation manner of this embodiment of the present invention, the foregoing acceleration sensor is replaced with a gravity sensor, and the angle between the plane on which the touchscreen of mobile terminal is located and the horizontal plane is detected by using the gravity sensor. A detection manner is basically the same as a manner in which the acceleration sensor performs detection and obtains the angle between the plane on which the touchscreen of mobile terminal is located and the horizontal plane, and details are not described herein again.

In a specific implementation manner of this embodiment of the present invention, within a preset time before step S1 is performed, it is detected whether the user is operating the mobile terminal and triggers an operation instruction. If no operation instruction triggered by the user on the mobile terminal is detected within the preset time, step S1 is performed. Generally, when the user does not expect to use the mobile terminal, the user manually places the mobile terminal at a position, and a process of manually placing the mobile terminal takes a time period. In this specific implementation manner, the preset time is determined according to the time period, and the determined preset time is shorter than the time period. A manner of determining the preset time includes: a first manner: manually setting the preset time, where the preset time that is manually set is shorter than the time period of manually placing the mobile terminal; and a second manner: setting the preset time according to experimental data, where the set preset time is shorter than the time period of manually placing the mobile terminal.

After the preset time is set, if the user uses the mobile terminal (for example, the user touches the touchscreen to trigger an operation instruction; and for another example, the user presses a key on the mobile terminal to trigger an operation instruction) within the preset time that is before step S1, step S1 is not performed. However, if no operation instruction triggered when the user uses the mobile terminal is detected throughout the preset time, step S1 is performed to detect whether an object exists within the preset distance facing the touchscreen of the mobile terminal, detect the light intensity of the environment in which the touchscreen is located, and detect whether the angle between the plane on which the touchscreen is located and the horizontal plane falls within the preset angle range.

Step S2: Set the touchscreen of the mobile terminal to a touch-disable mode if an object exists within the preset distance facing the touchscreen of the mobile terminal, the detected light intensity is less than preset intensity, and it is detected that the angle between the plane on which the touchscreen is located and the horizontal plane does not fall within the preset angle range.

In this embodiment of the present invention, when all the following conditions are met in this embodiment of the present invention, the touchscreen is locked and enters the touch-disable mode. The conditions include: 1. an object exists within the preset distance facing the touchscreen of the mobile terminal; 2. the detected light intensity is less than the preset intensity; and 3. it is detected that the angle between the plane on which the touchscreen is located and the horizontal plane does not fall within the preset angle range. When the foregoing conditions are met, if the touchscreen is not locked, a misoperation is easily caused on the touchscreen. For example, the user carries the mobile terminal, and whenever the user is in a non-static state, an incorrect touch easily occurs on the touchscreen of the mobile terminal, and therefore, if the touchscreen is not in the touch-disable mode, a misoperation is triggered. For another example, the user places the mobile terminal at a position within easy reach, and when the foregoing conditions are met when the mobile terminal is placed at the position and because the mobile terminal is usually in a non-static state at the position, an incorrect touch easily occurs on the touchscreen of the mobile terminal, and therefore, if the touchscreen is not in the touch-disable mode, a misoperation is triggered. Therefore, for a situation in which the foregoing three conditions are met and an incorrect touch easily occurs on the touchscreen, the touchscreen is set to the touch-disable mode in time.

In a preferred implementation manner of this embodiment, step S2 specifically includes: using the three following conditions as preset conditions: an object exists within the preset distance facing the touchscreen of the mobile terminal, the detected light intensity is less than the preset intensity, and it is detected that the angle between the plane on which the touchscreen is located and the horizontal plane does not fall within the preset angle range; and when the preset conditions are continuously met for specified duration, setting the touchscreen of the mobile terminal to the touch-disable mode.

In this implementation manner, light intensity detected at night is less than the preset intensity. In addition, the user can use the mobile terminal when the touchscreen is not horizontally placed, and in this case, it is detected that the angle between the plane on which the touchscreen is located and the horizontal plane does not fall within the preset angle range. Therefore, if the user operates the touchscreen with one or more fingers, an object (the fingers) exists in the direction facing the touchscreen of the mobile terminal. If the preset distance is set to a relatively large value, it is determined that the object (the fingers) exists within the preset distance facing the touchscreen of the mobile terminal. In this implementation manner, the preset distance may be set to a relatively small value, or even close to zero. In this way, a scope of an incorrect touch scenario can be narrowed down, and the fingers existing beyond the preset distance are excluded from a scenario in which an incorrect touch is easily caused. In addition, in this implementation manner, the specified duration may further be set, so as to prevent the touchscreen of the mobile terminal from being incorrectly set to the touch-disable mode simply because the touchscreen of the mobile terminal accidentally meets the preset conditions. Further, to prevent a normal operation of the user from being affected due to that the touchscreen frequently enters or exits the touch-disable mode simply because the touchscreen of the mobile terminal accidentally meets the preset conditions. In this implementation manner, the specified duration is set for the preset conditions. The specified duration may be modified, and a modification manner is not limited to a manual operation or program triggering.

In a case in which the specified duration is set, the touchscreen of the mobile terminal is set to the touch-disable mode only when the preset conditions are continuously met for the specified duration, thereby preventing the touchscreen of the mobile terminal from being set incorrectly or frequently set to the touch-disable mode incorrectly when the preset conditions are accidentally met.

In an implementation case of this implementation manner, after the preset conditions are continuously met for the specified duration and the touchscreen is set to the touch-disable mode, even if any one of the preset conditions (the condition that an object exists within the preset distance facing the touchscreen of the mobile terminal, or the condition that the detected light intensity is less than the preset intensity, or the condition that it is detected that the angle between the plane on which the touchscreen is located and the horizontal plane does not fall within the preset angle range) is not met, the touchscreen is still kept in the touch-disable mode unless the user manually makes the touchscreen exit the touch-disable mode.

In this embodiment of the present invention, an enable event has been preset, and a manner of setting the enable event is not limited in this embodiment of the present invention, where the enable event may be manually set or may be set by a program. The enable event includes but is not limited to: entering a preset gesture on the touchscreen, pressing a preset key, or executing a preset program by a processor of the mobile terminal.

Figure 2:
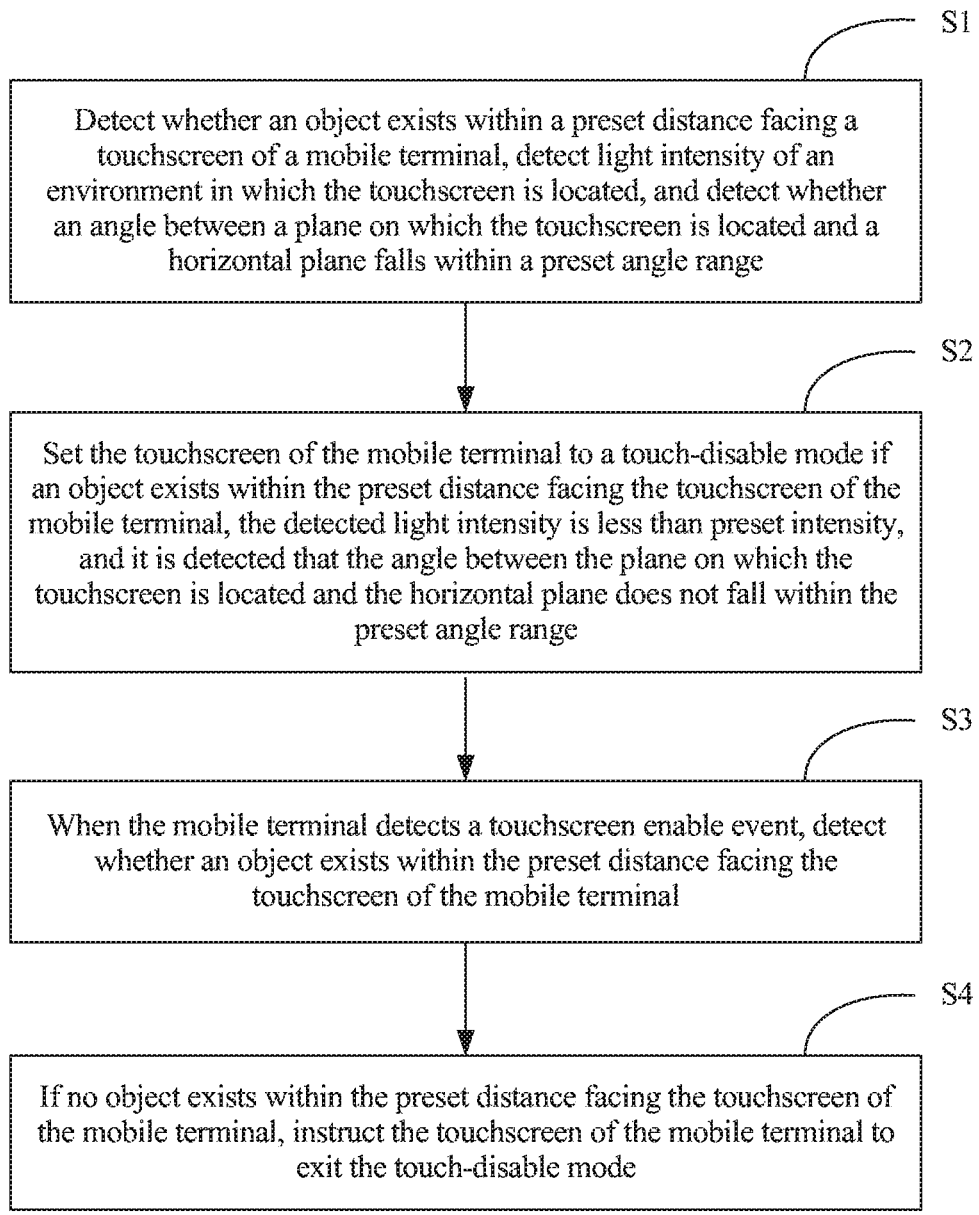
FIG. 2 is a flowchart of a method for preventing a touchscreen misoperation according to an embodiment of the present invention.
Figure 3:
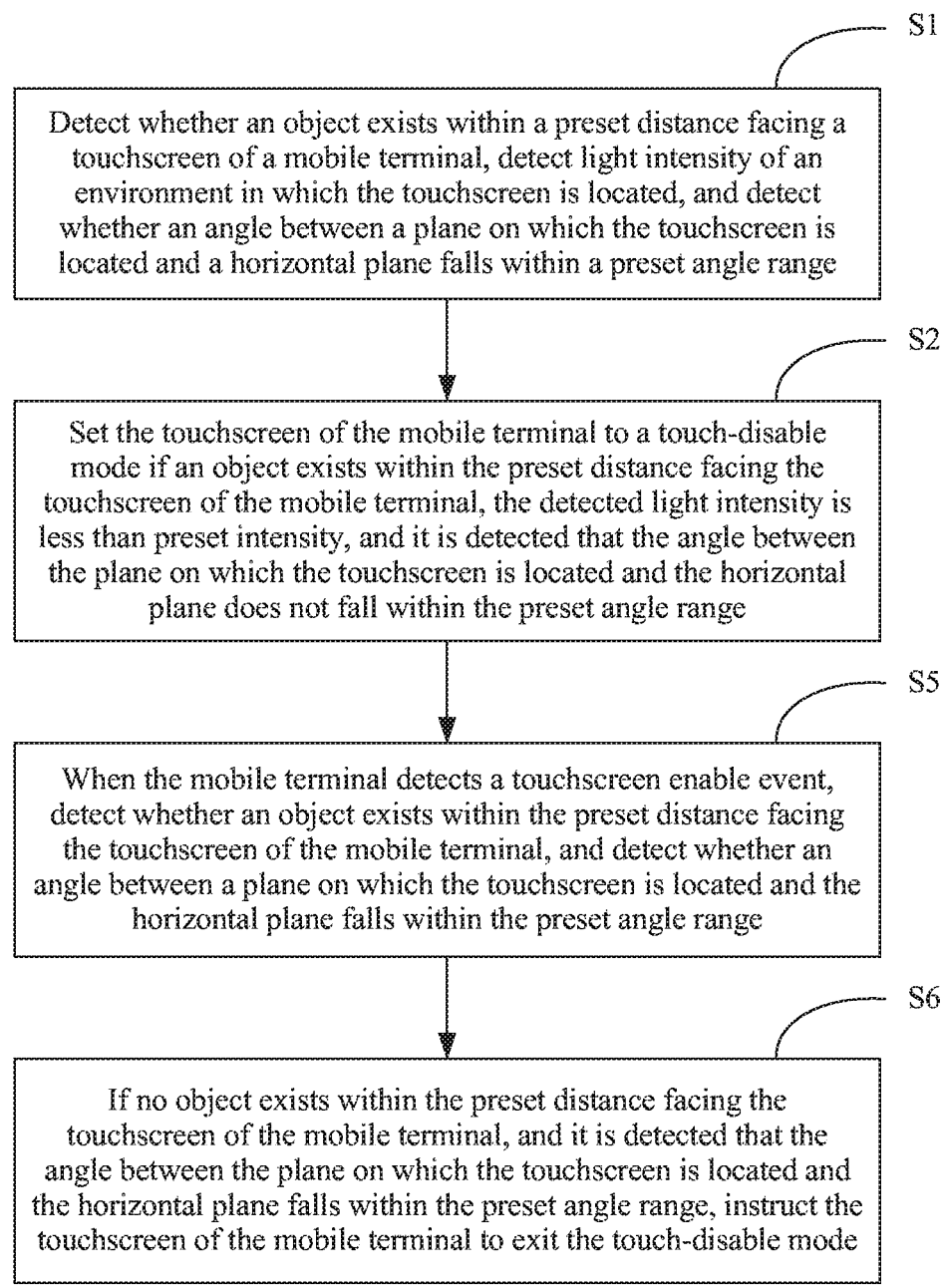
FIG. 3 is another flowchart of a method for preventing a touchscreen misoperation according to an embodiment of the present invention.
Figure 4:
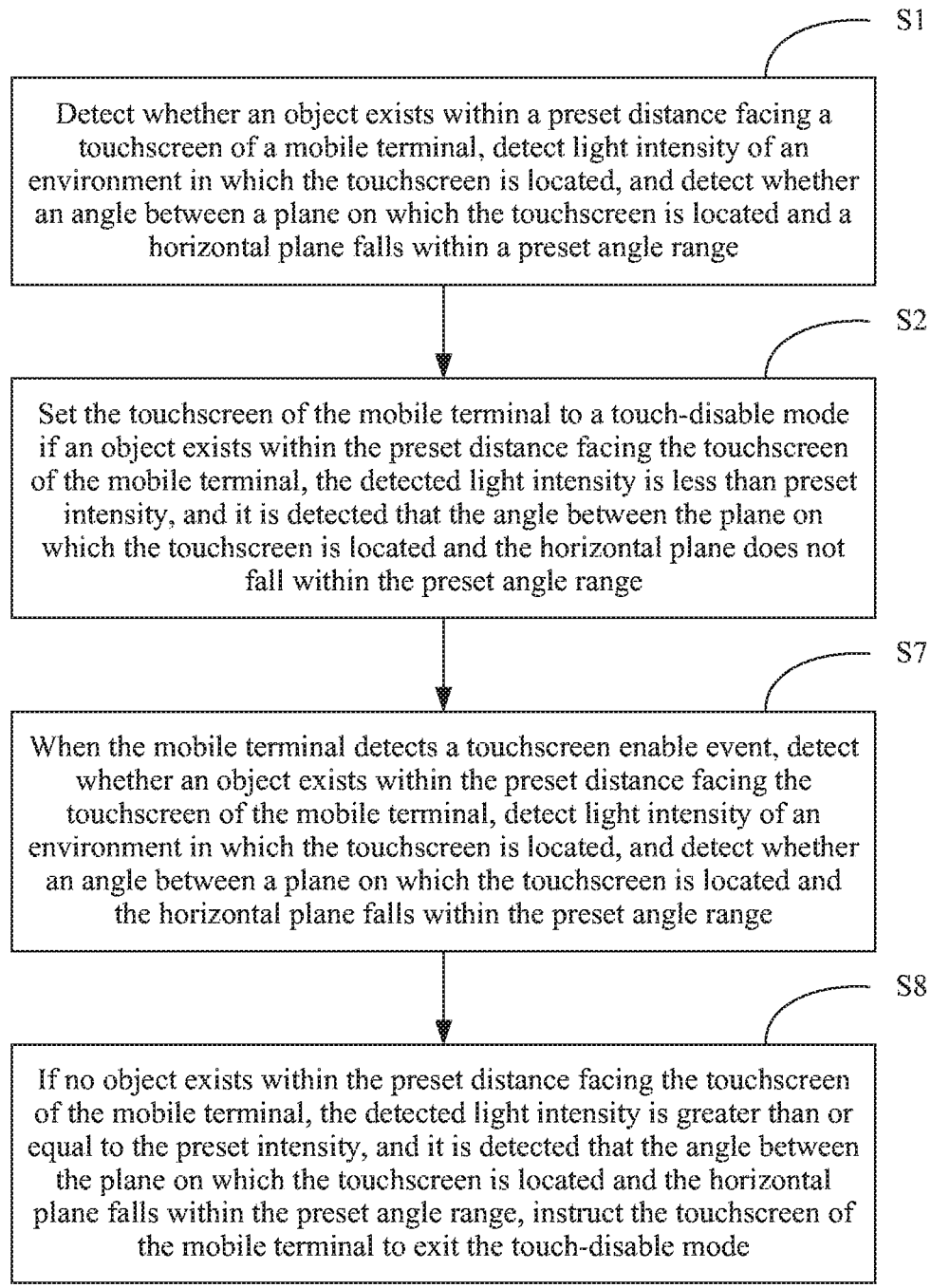
FIG. 4 is still another flowchart of a method for preventing a touchscreen misoperation according to an embodiment of the present invention.

After step S2, if the enable event is detected, step S3 and step S4 that are shown in FIG. 2 are performed to determine whether to exit the touch-disable mode, or step S5 and step S6 that are shown in FIG. 3 are performed to determine whether to exit the touch-disable mode, or step S7 and step S8 that are shown in FIG. 4 are performed to determine whether to exit the touch-disable mode.

FIG. 2 is an optimized flowchart of a method for preventing a touchscreen misoperation according to an embodiment of the present invention. However, only a part related to this embodiment is shown, and a part that is not related to this implementation manner is not further described and is not limited either.

In an implementation manner of this embodiment of the present invention, after the touchscreen of the mobile terminal is set to the touch-disable mode, if the mobile terminal detects a touchscreen enable event, the touchscreen exits the touch-disable mode, and is set to a normal mode in which the user can normally operate the mobile terminal by using the touchscreen. In the normal mode, the mobile terminal responds to any touch operation detected by the touchscreen, for example, answering a call or reading an SMS message in the normal mode. It should be noted that the enable event in this implementation manner includes an event such as information is received, there is an incoming call request, there is an alarm, a power button is incorrectly touched, or a camera is enabled. It should be further noted that the information (that is, the information received by the mobile terminal) in this implementation manner includes data such as a text, a picture, and a voice, and the data is generally in a binary format.

However, in this implementation manner, even if the mobile terminal detects the enable event (such as cases in which information is received and there is an incoming call request), to reduce a possibility of incorrectly touching the touchscreen after the touchscreen exits the touch-disable mode, the following condition for exiting the touch-disable mode still needs to be met, including: no object exists within the preset distance facing the touchscreen of the mobile terminal. Therefore, as shown in FIG. 2, after step S2, the method further includes the following steps.

Step S3: When the mobile terminal detects a touchscreen enable event, detect whether an object exists within the preset distance facing the touchscreen of the mobile terminal.

Step S4: If no object exists within the preset distance facing the touchscreen of the mobile terminal, make the touchscreen of the mobile terminal exit the touch-disable mode.

In this implementation manner, when detecting the touchscreen enable event, the mobile terminal immediately detects whether an object exists within the preset distance facing the touchscreen of the mobile terminal.

When detecting the enable event, the mobile terminal usually reminds the user, where a reminding manner is not limited herein, and includes voice reminding, vibration reminding, or the like. In addition, when detecting the enable event, the mobile terminal further detects whether an object exists within the preset distance facing the touchscreen of the mobile terminal.

When the mobile terminal detects the touchscreen enable event, if no object is detected within the preset distance facing the touchscreen of the mobile terminal, the touchscreen of the mobile terminal may be made to exit the touch-disable mode.

FIG. 3 is another optimized flowchart of a method for preventing a touchscreen misoperation according to an embodiment of the present invention. However, only a part related to this embodiment is shown, and a part that is not related to this implementation manner is not further described and is not limited either.

In an implementation manner of this embodiment of the present invention, referring to FIG. 3, after the step of setting the touchscreen of the mobile terminal to a touch-disable mode, the method further includes the following steps.

Step S5: When the mobile terminal detects a touchscreen enable event, detect whether an object exists within the preset distance facing the touchscreen of the mobile terminal, and detect whether an angle between a plane on which the touchscreen is located and the horizontal plane falls within the preset angle range.

Step S6: If no object exists within the preset distance facing the touchscreen of the mobile terminal, and it is detected that the angle between the plane on which the touchscreen is located and the horizontal plane falls within the preset angle range, make the touchscreen of the mobile terminal exit the touch-disable mode.

In this implementation manner, when detecting the touchscreen enable event, the mobile terminal not only detects whether an object exists within the preset distance facing the touchscreen of the mobile terminal, but also detects whether the angle between the plane on which the touchscreen is located and the horizontal plane falls within the preset angle range.

Because the user generally places the mobile terminal horizontally when using the mobile terminal, and even if the user does not use the mobile terminal, when it is detected that the touchscreen of the mobile terminal is horizontally placed, and that no object exists within the preset distance facing the touchscreen of the mobile terminal, an incorrect touch is hardly caused on the touchscreen after the touchscreen of the mobile terminal exits the touch-disable mode.

When the mobile terminal detects the touchscreen enable event, if no object is detected within the preset distance facing the touchscreen of the mobile terminal, the touchscreen of the mobile terminal may be made to exit the touch-disable mode. In this way, when the mobile terminal detects the touchscreen enable event and reminds the user in time, if a corresponding condition is met, step S6 is further performed to intelligently make the touchscreen exit the touch-disable mode, which omits an operation of manually making the touchscreen exit the touch-disable mode, and improves timeliness in reading information or answering an incoming call.

FIG. 4 is still another optimized flowchart of a method for preventing a touchscreen misoperation according to an embodiment of the present invention. However, only a part related to this embodiment is shown, and a part that is not related to this implementation manner is not further described and is not limited either.

In an implementation manner of this embodiment of the present invention, referring to FIG. 4, after the step of setting the touchscreen of the mobile terminal to a touch-disable mode, the method further includes the following steps.

Step S7: When the mobile terminal detects a touchscreen enable event, detect whether an object exists within the preset distance facing the touchscreen of the mobile terminal, detect light intensity of an environment in which the touchscreen is located, and detect whether an angle between a plane on which the touchscreen is located and the horizontal plane falls within the preset angle range.

Step S8: If no object is detected in a direction facing the touchscreen of the mobile terminal, or an object is detected but a distance between the object and the mobile terminal is less than the preset distance; the detected light intensity is greater than or equal to the preset intensity; and it is detected that the angle between the plane on which the touchscreen is located and the horizontal plane falls within the preset angle range, make the touchscreen of the mobile terminal exit the touch-disable mode.

Specifically, in this implementation manner, generally, the preset distance in this embodiment of the present invention is set to a relatively small value. Therefore, the following condition is added in this embodiment: the detected light intensity is greater than or equal to the preset intensity, so as to prevent the touchscreen from exiting the touch-disable mode because the following conditions are accidentally met, where the conditions include: no object exists within the preset distance facing the touchscreen of the mobile terminal, and it is detected that the angle between the plane on which the touchscreen is located and the horizontal plane falls within the preset angle range. For example, in a process in which the user takes the mobile terminal out of a bag or a pocket, the following conditions may be met: no object exists within the preset distance facing the touchscreen of the mobile terminal, and it is detected that the angle between the plane on which the touchscreen is located and the horizontal plane falls within the preset angle range. Consequently, the touchscreen exits the touch-disable mode, and an incorrect touch still easily occurs on the touchscreen in the process of taking out the mobile terminal.

Therefore, a stricter condition is put forward in this implementation manner, and can ensure that the touchscreen of the mobile terminal is horizontally placed, ensure that no object exists within the preset distance facing the touchscreen of the mobile terminal, and ensure that the light intensity is greater than or equal to the preset intensity. The touchscreen exits the touch-disable mode only in a safe environment in which the foregoing strict condition is met, thereby preventing a misoperation on the touchscreen.

In this way, when the mobile terminal detects the touchscreen enable event and reminds the user in time, if a corresponding condition is met, step S8 is further performed to intelligently make the touchscreen exit the touch-disable mode, which omits an operation of manually making the touchscreen exit the touch-disable mode, and improves timeliness in operating the mobile terminal (such as reading information or answering an incoming call) by using the touchscreen.

A person of ordinary skill in the art may understand that all or some of steps of the foregoing embodiment may be implemented by hardware or may be implemented by a program instructing related hardware. The program may be stored in a computer readable storage medium. The storage medium mentioned above may include a read-only memory, a magnetic disk, an optical disc, or the like.

It should be noted that, an apparatus for preventing a touchscreen misoperation according to an embodiment of the present invention and a method for preventing a touchscreen misoperation according to an embodiment of the present invention (as well as the foregoing method for preventing a touchscreen misoperation) are applicable to each other. Therefore, the following omits a description about implementation of the apparatus for preventing a touchscreen misoperation. In addition, for a composition structure of the apparatus for preventing a touchscreen misoperation according to an embodiment of the present invention, refer to FIG. 5. However, FIG. 5 shows only a part related to the present invention, and a part that is not related to the present invention is not limited herein, and due to limited space, is not further described either.

Figure 5:
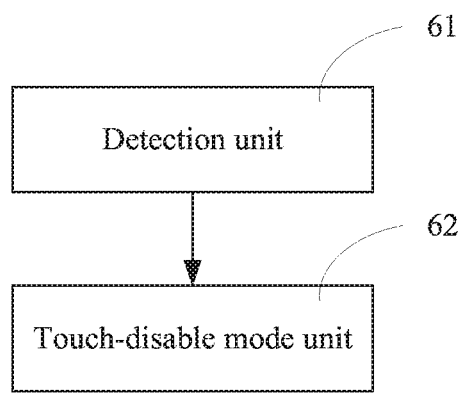
FIG. 5 is a diagram of a composition structure of an apparatus for preventing a touchscreen misoperation according to an embodiment of the present invention.

As shown in FIG. 5, an apparatus for preventing a touchscreen misoperation includes a detection unit 61 and a touch-disable mode unit 62, where the detection unit 61 is configured to: detect whether an object exists within a preset distance facing a touchscreen of a mobile terminal, detect light intensity of an environment in which the touchscreen is located, and detect whether an angle between a plane on which the touchscreen is located and a horizontal plane falls within a preset angle range; and the touch-disable mode unit 62 is configured to set the touchscreen of the mobile terminal to a touch-disable mode if the detection unit 61 detects that an object exists within the preset distance facing the touchscreen of the mobile terminal, the light intensity detected by the detection unit 61 is less than preset intensity, and the detection unit 61 detects that the angle between the plane on which the touchscreen is located and the horizontal plane does not fall within the preset angle range.

Figure 6:
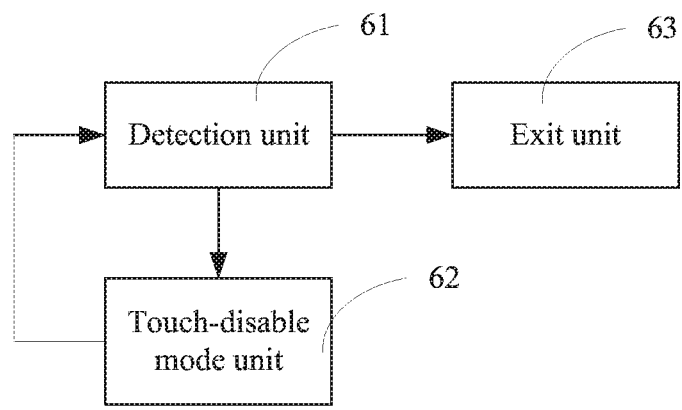
FIG. 6 is a diagram of a composition structure of an apparatus for preventing a touchscreen misoperation according to an embodiment of the present invention.

On the basis of the basic composition structure of the apparatus for preventing a touchscreen misoperation shown in FIG. 5, FIG. 6 shows an optimized composition structure of the apparatus for preventing a touchscreen misoperation. However, only a part related to the present invention is shown, and a part that is not related to this embodiment of the present invention is not limited herein, and due to limited space, is not further described either.

In an implementation manner of this embodiment of the present invention, as shown in FIG. 6, the detection unit 61 is further configured to: when the mobile terminal detects a touchscreen enable event, detect whether an object exists within the preset distance facing the touchscreen of the mobile terminal; and the apparatus further includes an exit unit 63, where the exit unit 63 is configured to: when the detection unit 61 detects that no object exists within the preset distance facing the touchscreen of the mobile terminal, make the touchscreen of the mobile terminal exit the touch-disable mode.

In another implementation manner of this embodiment of the present invention, as shown in FIG. 6, the detection unit 61 is further configured to: when the mobile terminal detects a touchscreen enable event, detect whether an object exists within the preset distance facing the touchscreen of the mobile terminal, and detect whether an angle between a plane on which the touchscreen is located and the horizontal plane falls within the preset angle range; and the apparatus further includes an exit unit 63, where the exit unit 63 is configured to: when the detection unit 61 detects that no object exists within the preset distance facing the touchscreen of the mobile terminal, and detects that the angle between the plane on which the touchscreen is located and the horizontal plane falls within the preset angle range, make the touchscreen of the mobile terminal exit the touch-disable mode.

In still another implementation manner of this embodiment of the present invention, as shown in FIG. 6, the detection unit 61 is further configured to: when the mobile terminal detects a touchscreen enable event, detect whether an object exists within the preset distance facing the touchscreen of the mobile terminal, detect light intensity of an environment in which the touchscreen is located, and detect whether an angle between a plane on which the touchscreen is located and the horizontal plane falls within the preset angle range; and the apparatus further includes an exit unit 63, where the exit unit 63 is configured to: when the detection unit 61 detects that no object exists within the preset distance facing the touchscreen of the mobile terminal, the light intensity detected by the detection unit 61 is greater than or equal to the preset intensity, and the detection unit 61 detects that the angle between the plane on which the touchscreen is located and the horizontal plane falls within the preset angle range, make the touchscreen of the mobile terminal exit the touch-disable mode.

Figure 7:
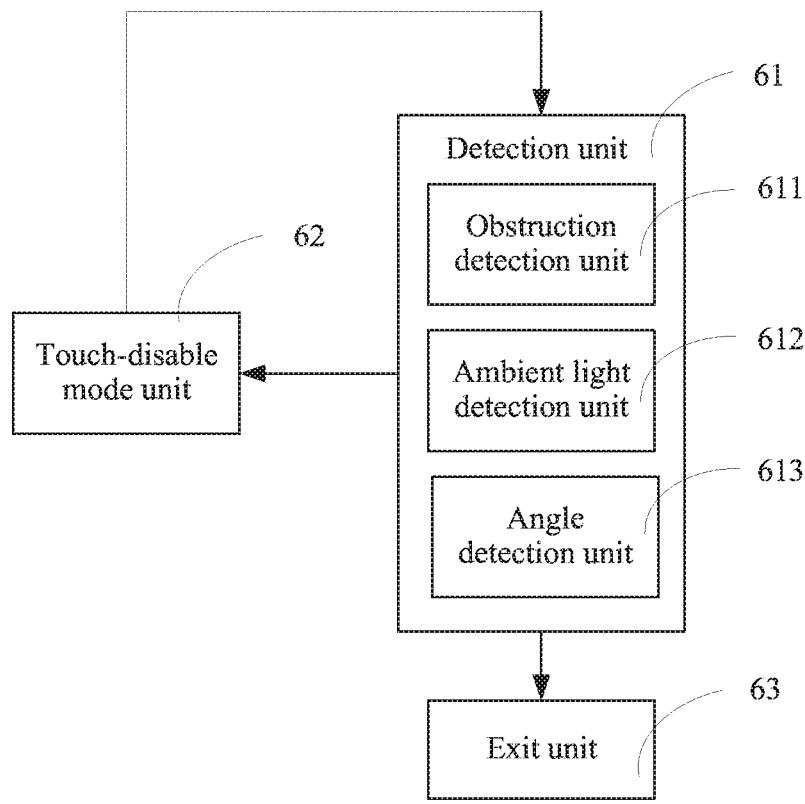
FIG. 7 is a diagram of another composition structure of an apparatus for preventing a touchscreen misoperation according to an embodiment of the present invention.

On the basis of the composition structure of the apparatus for preventing a touchscreen misoperation shown in FIG. 5 or FIG. 6, FIG. 7 shows another optimized composition structure of the apparatus for preventing a touchscreen misoperation. However, only a part related to the present invention is shown, and a part that is not related to the present invention is not limited herein, and due to limited space, is not further described either.

In a preferred implementation manner of the present invention, as shown in FIG. 7, the detection unit 61 includes an object detection unit 611, an ambient light detection unit 612, and an angle detection unit 613, where the object detection unit 611 is configured to detect, by using a proximity sensor, whether an object exists within the preset distance facing the touchscreen of the mobile terminal; the ambient light detection unit 612 is configured to detect the light intensity of the environment in which the touchscreen is located; and the angle detection unit 613 is configured to detect whether the angle between the plane on which the touchscreen is located and the horizontal plane falls within the preset angle range.

In an implementation manner of this embodiment of the present invention, the touch-disable mode unit 62 is specifically configured to: when preset conditions are continuously met for specified duration, set the touchscreen of the mobile terminal to the touch-disable mode, where the preset conditions are as follows: an object exists within the preset distance facing the touchscreen of the mobile terminal, the detected light intensity is less than the preset intensity, and it is detected that the angle between the plane on which the touchscreen is located and the horizontal plane does not fall within the preset angle range.

It should be noted that: during division of units for the apparatus for preventing a touchscreen misoperation according to the foregoing embodiment, division of the foregoing functional units is used only as an example for description. In an actual application, the foregoing functions may be allocated to different functional units for implementation as required, that is, an internal structure of a device is divided into different functional units to implement all or some of the functions described above. In addition, the apparatus for preventing a touchscreen misoperation according to the foregoing embodiment and the embodiment of the method for preventing a touchscreen misoperation pertain to a same concept. For a specific implementation process of the apparatus, refer to the method embodiment. Details are not described herein again.

Figure 8:
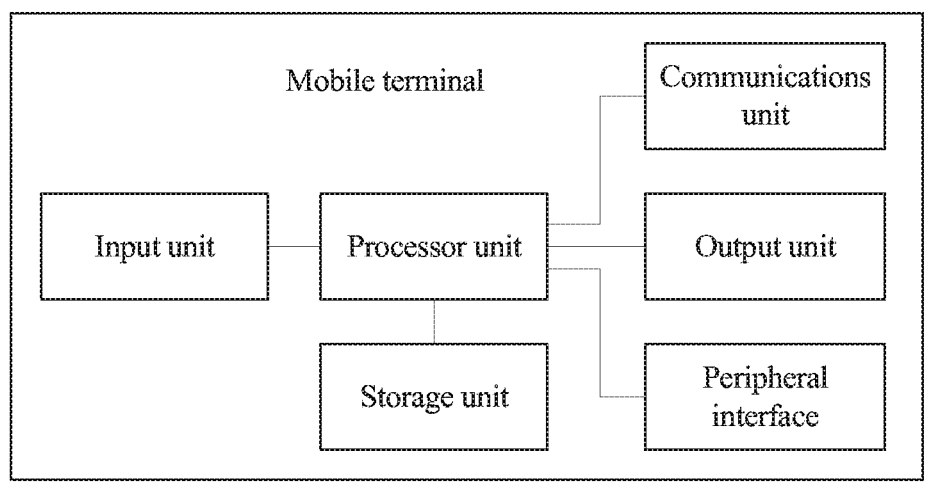
FIG. 8 is a diagram of a composition architecture of a mobile terminal described according to an embodiment of the present invention.

FIG. 8 shows a composition architecture of a mobile terminal according to an embodiment of the present invention. The mobile terminal includes the foregoing apparatus for preventing a touchscreen misoperation. However, only a part related to the present invention is shown, and a part that is not related to the present invention is not limited herein, and due to limited space, is not further described either.

As shown in FIG. 8, the mobile terminal in this embodiment of the present invention includes components such as an input unit, a processor unit, an output unit, a communications unit, a storage unit, and a peripheral interface. These components perform communication by using one or more buses. A person skilled in the art may understand that a structure of the mobile terminal constituted by the units does not constitute a limitation to the present invention. The structure may be a bus structure or may be a star structure, or may include more or less components than the foregoing components, or a combination of some components, or components disposed differently. In this implementation manner of the present invention, the mobile terminal may be any mobile device or portable mobile device, and includes but is not limited to a mobile phone, a mobile computer, a tablet computer, a personal digital assistant (PDA), a media player, a combination of two or more foregoing items, or the like.

For the input unit in the mobile terminal, the input unit is configured to implement interaction between a user and the mobile terminal and/or enter information into the mobile terminal. For example, the input unit may receive digit or character information that is entered by the user, so as to generate a signal input related to user setting or function control. In a specific implementation manner of the present invention, the input unit includes a touchscreen, or may be another human-computer interaction interface, such as a substantive input key or a microphone, or may be another apparatus for acquiring external information, such as a camera. The touchscreen, which is also referred to as a touchscreen or a touchscreen, can collect the user's operation action of touching or approaching the touchscreen, for example, an operation action performed on the touchscreen or at a position near the touchscreen by the user by using a finger, a stylus, or any proper object or accessory, and drive a corresponding connection apparatus according to a preset program. Optionally, the touchscreen may include two parts: a touch detection apparatus and a touch controller. The touch detection apparatus detects a touch operation of the user, converts the detected touch operation into an electrical signal, and transfers the electrical signal to the touch controller. The touch controller receives the electrical signal from the touch detection apparatus, converts the electrical signal into contact coordinates, and then sends the contact coordinates to the processor unit. The touch controller may further receive and execute a command sent by the processor unit. In addition, the touchscreen may be implemented in multiple types, such as a resistive type, a capacitive type, an infrared (Infrared) type, and a surface acoustic wave type. In another implementation manner of the present invention, the substantive input key used by the input unit may include but is not limited to one or more of a physical keyboard, a functional key (such as a volume control key or an on/off key), a trackball, a mouse, a joystick, or the like. An input unit in a form of a microphone may collect a voice that is input by the user or an environment, and convert the voice into a command that is in a form of an electric signal and can be executed by the processor unit. In other implementation manners of the present invention, the input unit includes various types of sensing components, for example, a Hall component, configured to detect a physical quantity of the mobile terminal, for example, force, torque, pressure, a stress, a position, displacement, a speed, an acceleration, an angle, an angular velocity, a revolution quantity, a rotation speed, or duration in which a working state changes, and convert the physical quantity into a quantity of electricity for detection and control. Other sensing components may further include a gravity sensor, a tri-axis accelerometer, a gyroscope, or the like.

However, it should be emphasized in this embodiment of the present invention that the input unit further includes a detection unit 61, where the detection unit 61 includes an object detection unit 611, an ambient light detection unit 612, and an angle detection unit 613.

The object detection unit 611 includes a proximity sensor, and detects, by using the proximity sensor, whether an object exists within a preset distance facing the touchscreen of the mobile terminal.

The ambient light detection unit 612 includes a light sensor, and detects, by using the proximity sensor or the light sensor, light intensity of an environment in which the touchscreen is located.

The angle detection unit 613 includes an acceleration sensor, and detects, by using the acceleration sensor, an angle between a plane on which the touchscreen of the mobile terminal is located and a horizontal plane. In an implementation manner, the input unit acquires a detection result from the acceleration sensor according to specified frequency. The processor unit obtains, by means of analysis from the acquired detection result, the angle between the plane on which the touchscreen of the mobile terminal is located and the horizontal plane. The specified frequency is set according to detection precision and reaction precision, which is not specifically limited in this embodiment of the present invention. For example, if it is expected to track in real time the angle between the plane on which the touchscreen of the mobile terminal is located and the horizontal plane, the specified frequency is set to a relatively large value. Preferably, the specified frequency is set to 50 times/second, 80 times/second, or too times/second.

For the processor unit in the mobile terminal, the processor unit is a control center of the mobile terminal, and is connected to all parts (including the components such as the input unit, the processor unit, the output unit, the communications unit, the storage unit, and the peripheral interface) of the entire mobile terminal by using various interfaces and lines, and performs various functions of the mobile terminal and/or processes data by running or executing a software program and/or a module stored in the storage unit and by invoking data stored in the storage unit. The processor unit may be constituted by an integrated circuit (IC for short), for example, the processor unit may be constituted by a single packaged IC, or may be constituted by connecting multiple packaged ICs that have a same function or different functions. For example, the processor unit may include only a central processing unit (CPU for short), or may be a combination of a graphics processor unit (GPU), a digital signal processor (DSP for short), and a control chip (for example, a baseband chip) in the communications unit. In this implementation manner of the present invention, the CPU may be a single computing core, or may include multiple computing cores.

The communications unit is configured to establish a communication channel, so that the mobile terminal is connected to a remote server by using the communication channel and downloads media data from the remote server. The communications unit may include a communications module such as a wireless local area network (WLAN for short) module, a Bluetooth module, a baseband module, and a mobile communications module (such as a general packet radio service technology (GPRS) module), and a radio frequency (RF for short) circuit corresponding to the communications unit, and is configured to perform data communication such as wireless local area network communication, Bluetooth communication, infrared ray communication, and mobile communication (such as cellular communications system communication), for example, Wideband Code Division Multiple Access (W-CDMA for short) and/or High Speed Downlink Packet Access (HSDPA for short). The communications module is configured to control communication between all the components in the mobile terminal, and can support direct memory access.

In different implementation manners of the present invention, various communications modules in the communications unit generally appear in a form of an integrated circuit chip, and may be selectively combined without a need of including all communications modules and a corresponding antenna group. For example, the communications unit may include only a baseband chip, a radio frequency chip, and a corresponding antenna, so as to provide a communication function in a cellular communications system. The mobile terminal can be connected to a cellular network or the Internet (Internet) by using a wireless communication connection established by the communications unit, for example, by means of wireless local area network access or WCDMA access. In some optional implementation manners of the present invention, the communications module, for example, the baseband module, in the communications unit may be integrated into the processor unit, typically, such as APQ+mobile device management (MDM) platforms provided by the Qualcomm™ Corporation.

The radio frequency circuit is configured to send and receive a signal in an information sending and receiving process or a call process. For example, after receiving downlink information of a base station, the radio frequency circuit sends the downlink information to the processor unit for processing; and in addition, sends designed uplink data to the base station. Generally, the radio frequency circuit includes a known circuit configured to perform these functions, and includes but is not limited to an antenna system, a radio frequency transceiver, one or more amplifiers, a tuner, one or more oscillators, a digital signal processor, a codec chip set, a subscriber identity module (SIM) card, a memory, or the like. In addition, the radio frequency circuit may further communicate with a network and another device by means of wireless communication. The wireless communication may use any communication standard or protocol, which includes but is not limited to GSM (Global System for Mobile Communications), GPRS (General Packet Radio Service), CDMA (Code Division Multiple Access), WCDMA (Wideband Code Division Multiple Access), a High Speed Uplink Packet Access technology (HSUPA), LTE (Long Term Evolution), email, SMS (Short Messaging Service), or the like.

However, it should be emphasized in this embodiment of the present invention that the mobile terminal needs to receive, by using the communications module, information described in this embodiment of the present invention, and the mobile terminal needs to receive an incoming call request by using the communications module.

The output unit is the touchscreen in this embodiment of the present invention. The output unit can be used by the user for outputting information such as a control key, a text, a picture, and a video, and the output unit can further receive a touch operation of the user. In a specific implementation manner of the present invention, after detecting a gesture operation of touching or approaching the touchscreen, the touchscreen transfers the gesture operation to the processor unit to determine a type of a touch event. Subsequently, the processor unit specifies a corresponding operation according to the type of the touch event, for example, exiting a touch-disable mode. The input unit and the output unit are used as two independent components to implement input and output functions of the mobile terminal. However, in this embodiment of the present invention, some input and output functions of the mobile terminal are implemented by integrating the touchscreen, that is, a touchscreen included in the input unit and the touchscreen in the output unit may be implemented by using a same touchscreen. A working mode provided by the processor unit in this embodiment of the present invention for the touchscreen includes a normal mode and the touch-disable mode. For example, the output unit can display various graphical user interfaces (GUI for short), so as to use the graphical user interfaces as virtual control components, and the graphical user interfaces include but are not limited to a window, a scrollbar, an icon, or a clipboard, so that the user operates in a touch manner.

The storage unit may be configured to store a software program and a module, and the processor unit, by running the software program and the module stored in the storage unit, executes various functional applications of the mobile terminal and implements data processing. The storage unit mainly includes a program storage area and a data storage area. The program storage area may store an operating system, and an application program, such as a sound play program or an image play program, required by at least one function. The data storage area may store data (such as audio data or a phonebook) that is created according to use of the mobile terminal, and the like. In a specific implementation manner of the present invention, the storage unit may include a volatile memory, such as a nonvolatile random access memory (NVRAM for short), a phase change random access memory (PRAM for short), or a magnetoresistive random access memory (MRAM for short), or may include a nonvolatile memory, such as at least one magnetic disk storage component, an electrically erasable programmable read-only memory (EEPROM for short), or a flash memory component, such as a NOR flash memory or a NAND flash memory. The nonvolatile memory stores an operating system and an application program that are executed by the processor unit. The processor unit loads, from the nonvolatile memory, a running program and data to a memory, and stores digital content to a high-capacity storage apparatus. The operating system includes various components and/or drivers that are configured to control and manage conventional system tasks, such as memory management, storage device control, and power management, and facilitate communication between various software and hardware. In this implementation manner of the present invention, the operating system may be an Android system of the Google™ Corporation, an iOS™ system developed by the Apple Corporation™, a Windows™ operating system developed by the Microsoft Corporation™, or the like, or may be an embedded operating system such as Vxworks™. The application program includes any application installed on the mobile terminal, and includes but is not limited to a browser, an email, an instant message service, word processing, a virtual keyboard, a window widget, encryption, digital copyright management, voice recognition, voice duplication, positioning (such as a function provided by a Global Positioning System), music play, or the like.

In this embodiment of the present invention, for the storage unit of the mobile terminal, the storage unit stores a method for preventing a touchscreen misoperation according to an embodiment of the present invention, so that the method for preventing a touchscreen misoperation can be invoked and executed by using the processor unit, so as to implement functions of the touch-disable mode unit 62 and the exit unit 63, and further implement control of whether the touchscreen enters or exits the touch-disable mode.

In this embodiment of the present invention, the method for preventing a touchscreen misoperation stored by the storage unit includes at least: step S1: detecting whether an object exists within a preset distance facing a touchscreen of a mobile terminal, detecting light intensity of an environment in which the touchscreen is located, and detecting whether an angle between a plane on which the touchscreen is located and a horizontal plane falls within a preset angle range; and step S2: setting the touchscreen of the mobile terminal to a touch-disable mode if an object exists within the preset distance facing the touchscreen of the mobile terminal, the detected light intensity is less than preset intensity, and it is detected that the angle between the plane on which the touchscreen is located and the horizontal plane does not fall within the preset angle range.

In a specific implementation manner of this embodiment of the present invention, step S2 in the method for preventing a touchscreen misoperation stored by the storage unit may be: using the three following conditions as preset conditions: an object exists within the preset distance facing the touchscreen of the mobile terminal, the detected light intensity is less than the preset intensity, and it is detected that the angle between the plane on which the touchscreen is located and the horizontal plane does not fall within the preset angle range; and when the preset conditions are continuously met for specified duration, setting the touchscreen of the mobile terminal to the touch-disable mode.

In a specific implementation manner of this embodiment of the present invention, the method for preventing a touchscreen misoperation stored by the storage unit may further include: step S3: when the mobile terminal detects a touchscreen enable event, detecting whether an object exists within the preset distance facing the touchscreen of the mobile terminal; and step S4: if no object exists within the preset distance facing the touchscreen of the mobile terminal, making the touchscreen of the mobile terminal exit the touch-disable mode. Alternatively, in a specific implementation manner of this embodiment of the present invention, the method for preventing a touchscreen misoperation stored by the storage unit may further include: step S5: when the mobile terminal detects a touchscreen enable event, detecting whether an object exists within the preset distance facing the touchscreen of the mobile terminal, and detecting whether an angle between a plane on which the touchscreen is located and the horizontal plane falls within the preset angle range; and step S6: if no object exists within the preset distance facing the touchscreen of the mobile terminal, and it is detected that the angle between the plane on which the touchscreen is located and the horizontal plane falls within the preset angle range, making the touchscreen of the mobile terminal exit the touch-disable mode. Still alternatively, in a specific implementation manner of this embodiment of the present invention, the method for preventing a touchscreen misoperation stored by the storage unit may further include: step S7: when the mobile terminal detects a touchscreen enable event, detecting whether an object exists within the preset distance facing the touchscreen of the mobile terminal, detecting light intensity of an environment in which the touchscreen is located, and detecting whether an angle between a plane on which the touchscreen is located and the horizontal plane falls within the preset angle range; and step S8: if no object is detected in a direction facing the touchscreen of the mobile terminal, or an object is detected but a distance between the object and the mobile terminal is less than the preset distance; the detected light intensity is greater than or equal to the preset intensity; and it is detected that the angle between the plane on which the touchscreen is located and the horizontal plane falls within the preset angle range, making the touchscreen of the mobile terminal exit the touch-disable mode.

For the peripheral interface in the mobile terminal, data transmission with another electronic device is performed by using the peripheral interface, and the peripheral interface includes an interface that can be used for data transmission, such as a serial interface (such as a USB interface), a parallel interface, or a radio interface (such as an antenna for accessing a WLAN).

Figure 9:
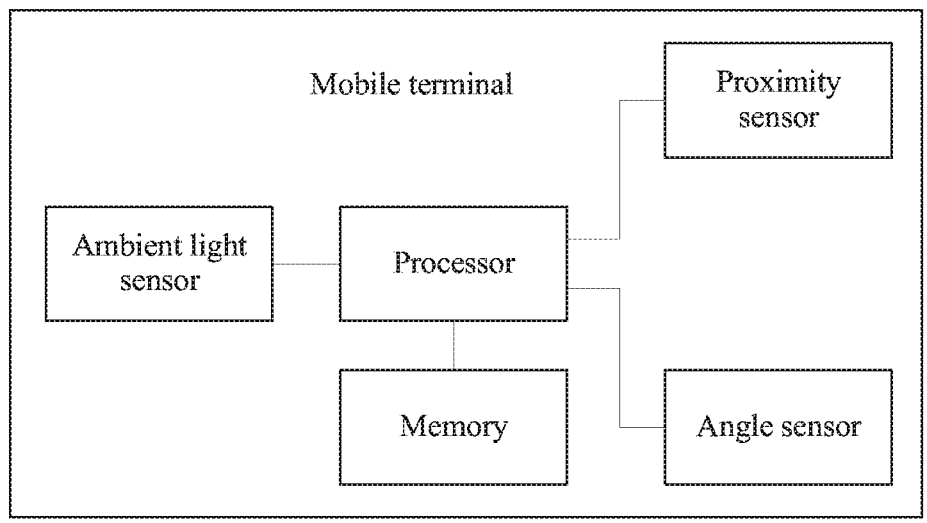
FIG. 9 is a diagram of another composition architecture of a mobile terminal described according to an embodiment of the present invention.

FIG. 9 shows a composition architecture of a mobile terminal having a touchscreen according to an embodiment of the present invention. For ease of description, only a part related to this embodiment of the present invention is shown. It should be noted that a method for preventing a touchscreen misoperation according to an embodiment of the present invention is applicable to the mobile terminal having a touchscreen shown in FIG. 9.

The mobile terminal having a touchscreen shown in FIG. 9 includes a memory, and further includes: a proximity sensor, configured to detect whether an object exists within a preset distance facing the touchscreen; an ambient light sensor, configured to detect light intensity of an environment in which the mobile terminal is located; an angle sensor, configured to detect whether an angle between a plane on which the touchscreen is located and a horizontal plane falls within a preset angle range; and a processor, configured to set the touchscreen of the mobile terminal to a touch-disable mode when the proximity sensor detects that an object exists within the preset distance facing the touchscreen, the light intensity detected by the ambient light sensor is less than preset intensity, and the angle sensor detects that the angle between the plane on which the touchscreen is located and the horizontal plane does not fall within the preset angle range.

The processor may be an integrated circuit chip, and has a signal processing capability. In an implementation process, steps of the foregoing method may be completed by using an integrated logic circuit of hardware in the processor or an instruction in a form of software. The foregoing processor that is configured to execute the method disclosed in the embodiments of the present invention may be a central processing unit (CPU), a digital signal processor (DSP), an application-specific integrated circuit (ASIC), a field programmable gate array (FPGA), or another programmable logic device, a discrete gate or transistor logic device, or a discrete hardware component. Steps of the method disclosed with reference to the embodiments of the present invention may be directly executed and completed by means of a hardware processor, or may be executed and completed by using a combination of hardware and software in the processor. The software may be located in a mature storage medium in the field, such as a random access memory, a flash memory, a read-only memory, a programmable read-only memory, an electrically erasable programmable memory, or a register. The storage medium is located in the memory, and the processor reads information in the memory and completes the steps in the foregoing method in combination with the hardware in the processor.

In this embodiment of the present invention, the memory stores at least the following data: setting the touchscreen of the mobile terminal to a touch-disable mode when the proximity sensor detects that an object exists within the preset distance facing the touchscreen, the light intensity detected by the ambient light sensor is less than preset intensity, and the angle sensor detects that the angle between the plane on which the touchscreen is located and the horizontal plane does not fall within the preset angle range.

In a specific implementation manner of this embodiment of the present invention, the processor is further configured to: detect a touchscreen enable event of the mobile terminal, and when detecting the touchscreen enable event, instruct the proximity sensor to detect whether an object exists within the preset distance facing the touchscreen; and when the proximity sensor detects that no object exists within the preset distance facing the touchscreen, make the mobile terminal exit the touch-disable mode.

In this specific implementation manner, to implement the foregoing function, the processor needs to correspondingly store the following data in the memory: detecting a touchscreen enable event of the mobile terminal, and when the touchscreen enable event is detected, instructing the proximity sensor to detect whether an object exists within the preset distance facing the touchscreen; and when the proximity sensor detects that no object exists within the preset distance facing the touchscreen, making the mobile terminal exit the touch-disable mode.

In a specific implementation manner of this embodiment of the present invention, the processor is further configured to: detect a touchscreen enable event of the mobile terminal, and when detecting the touchscreen enable event, instruct the proximity sensor to detect whether an object exists within the preset distance facing the touchscreen, and instruct the angle sensor to detect whether an angle between a plane on which the touchscreen is located and the horizontal plane falls within the preset angle range; and when the proximity sensor detects that no object exists within the preset distance facing the touchscreen, and the angle sensor detects that the angle between the plane on which the touchscreen is located and the horizontal plane falls within the preset angle range, make the mobile terminal exit the touch-disable mode.

In this specific implementation manner, to implement the foregoing function, the processor needs to correspondingly store the following data in the memory: detecting a touchscreen enable event of the mobile terminal, and when the touchscreen enable event is detected, instructing the proximity sensor to detect whether an object exists within the preset distance facing the touchscreen, and instructing the angle sensor to detect whether an angle between a plane on which the touchscreen is located and the horizontal plane falls within the preset angle range; and when the proximity sensor detects that no object exists within the preset distance facing the touchscreen, and the angle sensor detects that the angle between the plane on which the touchscreen is located and the horizontal plane falls within the preset angle range, making the mobile terminal exit the touch-disable mode.

In a specific implementation manner of this embodiment of the present invention, the processor is further configured to: detect a touchscreen enable event of the mobile terminal, and when detecting the touchscreen enable event, instruct the proximity sensor to detect whether an object exists within the preset distance facing the touchscreen, instruct the ambient light sensor to detect light intensity of an environment in which the mobile terminal is located, and further instruct the angle sensor to detect whether an angle between a plane on which the touchscreen is located and the horizontal plane falls within the preset angle range; and when the proximity sensor detects that no object exists within the preset distance facing the touchscreen, the light intensity detected by the ambient light sensor is greater than or equal to the preset intensity, and the angle sensor detects that the angle between the plane on which the touchscreen is located and the horizontal plane falls within the preset angle range, make the mobile terminal exit the touch-disable mode.

In this specific implementation manner, to implement the foregoing function, the processor needs to correspondingly store the following data in the memory: detecting a touchscreen enable event of the mobile terminal, and when the touchscreen enable event is detected, instructing the proximity sensor to detect whether an object exists within the preset distance facing the touchscreen, instructing the ambient light sensor to detect light intensity of an environment in which the mobile terminal is located, and instructing the angle sensor to detect whether an angle between a plane on which the touchscreen is located and the horizontal plane falls within the preset angle range; and when the proximity sensor detects that no object exists within the preset distance facing the touchscreen, the light intensity detected by the ambient light sensor is greater than or equal to the preset intensity, and the angle sensor detects that the angle between the plane on which the touchscreen is located and the horizontal plane falls within the preset angle range, making the mobile terminal exit the touch-disable mode.

In a specific implementation manner of this embodiment of the present invention, the processor is further configured to: when preset conditions are continuously met for specified duration, set the touchscreen of the mobile terminal to the touch-disable mode, where the preset conditions are as follows: the proximity sensor detects that an object exists within the preset distance facing the touchscreen of the mobile terminal, the light intensity detected by the ambient light sensor is less than the preset intensity, and the angle sensor detects that the angle between the plane on which the touchscreen is located and the horizontal plane does not fall within the preset angle range.

In this specific implementation manner, to implement the foregoing function, the processor needs to correspondingly store the following data in the memory: when preset conditions are continuously met for specified duration, setting the touchscreen of the mobile terminal to the touch-disable mode, where the preset conditions are as follows: the proximity sensor detects that an object exists within the preset distance facing the touchscreen of the mobile terminal, the light intensity detected by the ambient light sensor is less than the preset intensity, and the angle sensor detects that the angle between the plane on which the touchscreen is located and the horizontal plane does not fall within the preset angle range.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

The invention claimed is:

1. A method comprising:
   detecting, by a mobile terminal, that no user operation instruction is triggered on the mobile terminal during a first time period;
   based on the detection, determining by the mobile terminal that all of the following conditions are continuously met during a second time period, wherein the conditions comprise:
   detecting that an object is within a preset distance facing a touchscreen of the mobile terminal,
   detecting that light intensity of an environment in which the touchscreen is located is less than a preset intensity, and
   detecting that an angle between a plane on which the touchscreen is located and a horizontal plane does not fall within a preset angle range; and
   based on the determination, setting by the mobile terminal the touchscreen of the mobile terminal to a touch-disable mode.

2. The method according to claim 1, wherein after setting the touchscreen of the mobile terminal to the touch-disable mode, the method further comprises:
   in response to detecting a touchscreen enable event:
   determining that the object is not within the preset distance of the touchscreen of the mobile terminal and
   exiting the touch-disable mode of the touchscreen of the mobile terminal based on the determination.

3. The method according to claim 1, wherein after setting the touchscreen of the mobile terminal to the touch-disable mode, the method further comprises:
   in response to detecting a touchscreen enable event:
   first determining that the object is not within the preset distance of the touchscreen of the mobile terminal, and
   second determining that the angle between the plane on which the touchscreen is located and the horizontal plane falls within the preset angle range; and
   exiting the touch-disable mode based on the first and the second determinations.

4. The method according to claim 1, wherein after setting the touchscreen of the mobile terminal to the touch-disable mode, the method further comprises:
   first determining that the object is not within the preset distance of the touchscreen of the mobile terminal
   second determining that light intensity of the environment in which the touchscreen is located is greater than or equal to the preset intensity, and third determining that the angle between the plane on which the touchscreen is located and the horizontal plane falls within the preset angle range; and
   exiting the touch-disable mode of the touchscreen of the mobile terminal based on the first, second and third determinations.

5. The method according to claim 1, wherein detecting whether the object is within the preset distance of the touchscreen of a mobile terminal comprises detecting, by a proximity sensor, whether the object is within the preset distance of the touchscreen of the mobile terminal.

6. A mobile terminal, comprising:
   a touchscreen;
   a proximity sensor, configured to detect whether an object is within a preset distance of the touchscreen;
   an ambient light sensor, configured to detect light intensity of an environment in which the mobile terminal is located;
   an angle sensor, configured to detect whether an angle between a plane on which the touchscreen is located and a horizontal plane falls within a preset angle range;
   a memory storage comprising a program; and
   one or more processors in communication with the touchscreen, the proximity sensor, the ambient light sensor, the angle sensor, and a non-transitory computer readable storage medium, wherein the one or more processors execute the program to:
   detect that no user operation instruction is triggered on the mobile terminal during a first time period;
   based on the detection, determine that all of the following conditions are continuously met during a second time period, wherein the conditions comprise: detecting that the object is within the preset distance facing the touchscreen, detecting that the light intensity is less than a preset intensity, and detecting that the angle between the plane on which the touchscreen is located and the horizontal plane does not fall within the preset angle range; and based on the determination, set the touchscreen of the mobile terminal to a touch-disable mode.

7. The mobile terminal according to claim 6, wherein the one or more processors further execute the program to:

detect a touchscreen enable event of the mobile terminal;
instruct the proximity sensor to detect that the object is not within the preset distance of the touchscreen in response to detecting the touchscreen enable event; and
exit the touch-disable mode of the touchscreen of the mobile terminal in response to detecting that the object is not within the preset distance of the touchscreen.

8. The mobile terminal according to claim 6, wherein the one or more processors further execute the program to:

detect a touchscreen enable event of the mobile terminal;
instruct the proximity sensor to detect that the object is not within the preset distance of the touchscreen and instruct the angle sensor to detect whether the angle between the plane on which the touchscreen is located and the horizontal plane falls within the preset angle range, in response to detecting the touchscreen enable event; and
exit the touch-disable mode of the touchscreen of the mobile terminal, in response to detecting that object is not within the preset distance of the touchscreen and detecting that the angle between the plane on which the touchscreen is located and the horizontal plane falls within the preset angle range.

9. The mobile terminal according to claim 6, wherein the one or more processors further execute the program to:

detect a touchscreen enable event of the mobile terminal;
instruct the proximity sensor to detect that the object is not within the preset distance of the touchscreen, instruct the ambient light sensor to detect light intensity of the environment in which the mobile terminal is located, and instruct the angle sensor to detect whether the angle between the plane on which the touchscreen is located and the horizontal plane falls within the preset angle range, in response to detecting the touchscreen enable event; and
exit the touch-disable mode of the touchscreen of the mobile terminal, in response to detecting that the object is not within the preset distance facing the touchscreen, the light intensity detected by the ambient light sensor is greater than or equal to the preset intensity, and the angle sensor detects that the angle between the plane on which the touchscreen is located and the horizontal plane falls within the preset angle range.

10. A non-transitory computer readable storage medium storing a program for execution by a processor of a mobile terminal, the program including instructions to:

detect that no user operation instruction is triggered on the mobile terminal during a first time period;
based on the detection, determine that all of the following conditions are continuously met during a second time period, wherein the conditions comprise:
detecting that an object is within a preset distance facing a touchscreen of the mobile terminal, detecting that light intensity of an environment in which the touchscreen is located is less than a preset intensity, and detecting that an angle between a plane on which the touchscreen is located and a horizontal plane does not fall within a preset angle range; and based on the determination, set the touchscreen of the mobile terminal to a touch disable mode.

11. The non-transitory computer readable storage medium according to claim 10, wherein instructions further comprise instructions to:

detect a touchscreen enable event of the mobile terminal;
instruct a proximity sensor to detect that the object is not within the preset distance of the touchscreen in response to detecting the touchscreen enable event; and
exit the touch-disable mode of the touchscreen of the mobile terminal, in response to detecting that the object is not within the preset distance of the touchscreen.

12. The non-transitory computer readable storage medium according to claim 10, wherein instructions further comprise instructions to:

detect a touchscreen enable event of the mobile terminal;
instruct a proximity sensor to detect that the object is not within the preset distance of the touchscreen and instruct an angle sensor to detect whether the angle between the plane on which the touchscreen is located and the horizontal plane falls within the preset angle range, in response to detecting the touchscreen enable event; and
exit the touch-disable mode of the touchscreen of the mobile terminal, in response to detecting that the object is not within the preset distance of the touchscreen and detecting that the angle between the plane on which the touchscreen is located and the horizontal plane falls within the preset angle range.

13. The non-transitory computer readable storage medium according to claim 10, wherein instructions further comprise instructions to:

detect a touchscreen enable event of the mobile terminal;
instruct a proximity sensor to detect that the object is not within the preset distance of the touchscreen, instruct an ambient light sensor to detect light intensity of the environment in which the mobile terminal is located, and instruct an angle sensor to detect whether the angle between the plane on which the touchscreen is located and the horizontal plane falls within the preset angle range, in response to detecting the touchscreen enable event; and
exit the touch-disable mode of the touchscreen of the mobile terminal, in response to not detecting that the object is not within the preset distance of the touchscreen, the light intensity detected by the ambient light sensor is greater than or equal to the preset intensity, and the angle sensor detects that the angle between the plane on which the touchscreen is located and the horizontal plane falls within the preset angle range.

14. The method according to claim 1, wherein in the touch-disable mode the touchscreen is locked and the mobile terminal does not respond to any other touches received by using the touchscreen except for unlocking the touchscreen in a preset touch manner.

15. The mobile terminal according to claim 6, wherein in the touch-disable mode the touchscreen is locked and the mobile terminal does not respond to any other touches received by using the touchscreen except for unlocking the touchscreen in a preset touch manner.

16. The non-transitory computer readable storage medium according to claim 10, wherein in the touch-disable mode the touchscreen is locked and the mobile terminal does not respond to any other touches received by using the touchscreen except for unlocking the touchscreen in a preset touch manner.

\* \* \* \* \*